Nov. 27, 1923.
H. C. EGERTON
1,475,623
PHONOGRAPH HORN, ETC
Original Filed March 6, 1919
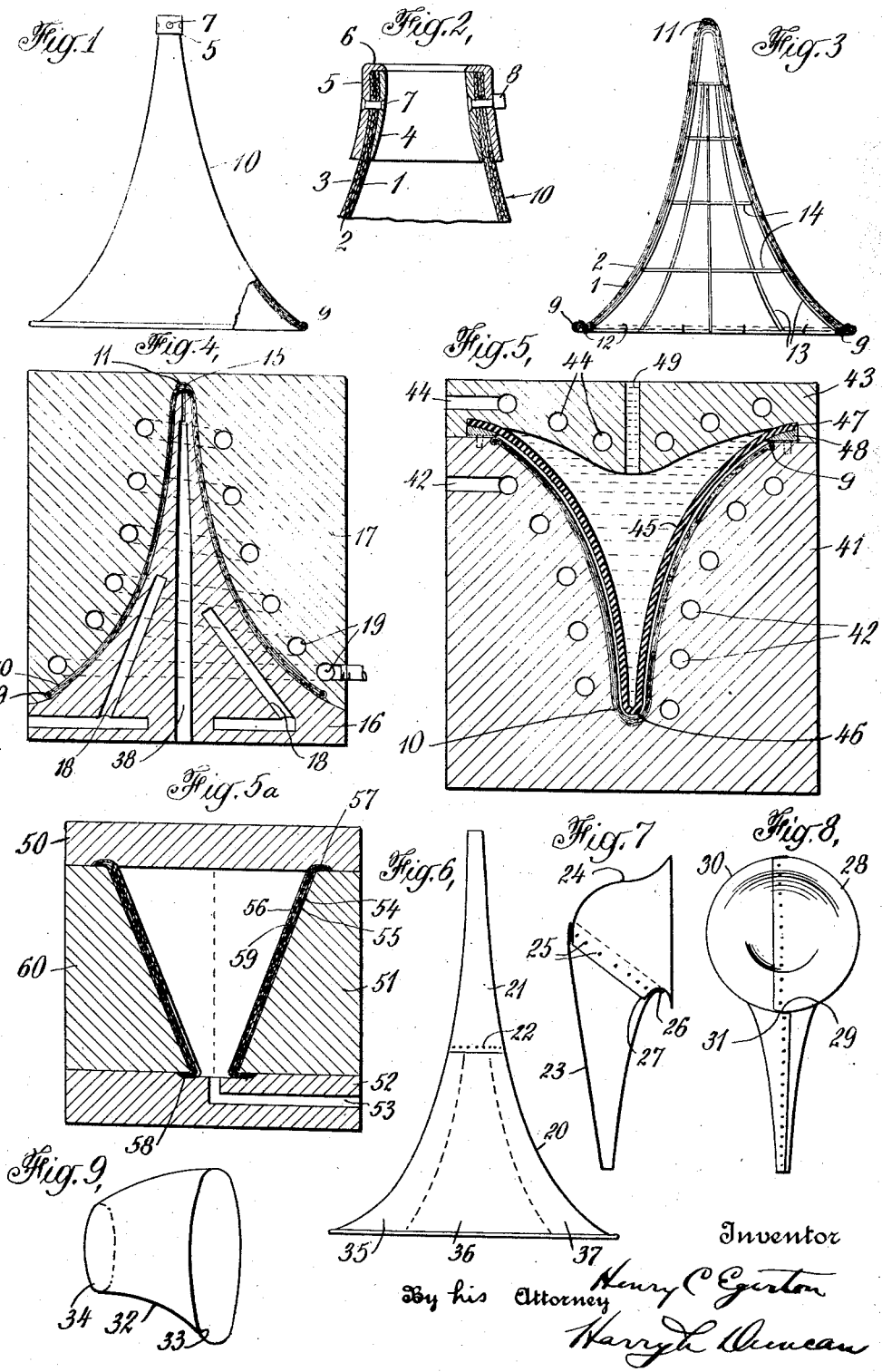

Patented Nov. 27, 1923.

1,475,623

UNITED STATES PATENT OFFICE.

HENRY C. EGERTON, OF RIDGEWOOD, NEW JERSEY.

PHONOGRAPH HORN, ETC.

Application filed March 6, 1919, Serial No. 280,963. Renewed April 30, 1923.

*To all whom it may concern:*

Be it known that I, HENRY C. EGERTON, a citizen of the United States, and resident of Ridgewood, county of Bergen, State of New Jersey, have made a certain new and useful Invention Relating to Phonograph Horns, Etc., of which the following is a specification taken in connection with the accompanying drawing.

This invention relates especially to horns for phonographs and other acoustic apparatus which are preferably made of one or more layers of elastic fabric such as knit cotton fabric impregnated or coated with dried bakelite varnish compositions and then heat cured in the desired shape under considerable pressure which solidifies the different layers or fibres of the fabric and greatly strengthens them through the incorporated phenolic condensation cementing material so that a strong and impervious hollow article is secured which at the same time has the decided advantage of relatively light weight. With the flaring horns of the flower petal type, it is advantageous in some cases to form the unitary pieces of knit or other fabric in suitably narrowed or fashioned shape generally approximating the desired size of the finished horn at various parts of its length so that less local stretching or distortion of the fabric is necessary and thus a greater uniformity of thickness is secured. Ribbed or other knit fabric, moreover, is very desirable for this purpose because of the high degree of elasticity which it possesses which allows where necessary considerable local stretching without wrinkling or tearing as compared to other fabric, such as regular woven cloth, paper, etc. In some cases, however, pieces of ribbed or other knit or woven fabric may be sewed or otherwise united to form fabric gores or sections which when secured together approximate the final shape of the horn or other article and by superimposing several layers of such shaped or tailored united sections a generally satisfactory result can be secured for many classes of work. In these cases, however, it is especially desirable where a more uniform or better finish is desired on the outside and other exposed surfaces of the horn to cover such tailored or united fabric sections with a unitary narrowed or fashioned knit fabric layer which may sometimes have its surface napped or combed up to give a still more uniform appearance. In some cases also an outside knit fabric layer need not be so thoroughly impregnated or coated with the phenolic condensation cementing material, but it may be used as a colored or decorated outer surface by having any desired pattern knit into the fabric originally or by having the fabric stencilled or otherwise painted or decorated with suitable colors which will stand the curing heat to which the final article is subjected where this coloring is performed before the heat curing union of the fabric elements. For some purposes a desirable effect can be secured by superimposing layers of netting, lace or other figured open work fabric of contrasting colors over a relatively plain or other knit or other fabric, the whole being more or less united by the phenolic condensation cementing material or being otherwise united by varnish or other finish coatings which may be subsequently applied in some cases.

As indicated in a somewhat diagrammatic way in the accompanying drawings showing illustrative embodiments of the invention, the horn may be formed in one piece as indicated in Fig. 1 which is an elevation partly in section.

Fig. 2 is an enlarged detail section of the throat portion of this horn.

Fig. 3 is a longitudinal section through the uncured fabric blank and the wire or other support on which it may be arranged.

Fig. 4 is a sectional view showing the curing moulds in which the horn may be heat cured under high pressure.

Figs. 5 and 5ª show other forms of pressure moulding apparatus.

Fig. 6 is an outside view showing another form of horn having tailored fabric sections.

Fig. 7 is a longitudinal section view showing another form of horn which may be built up or assembled from two sections of such cured impregnated fabric.

Fig. 8 is a front elevation showing a built-up horn in which the two pieces or elements are arranged transversely.

Fig. 9 is a perspective view showing still another type of phonograph horn.

The phonograph or acoustic horn shown in Fig. 1 may comprise one or more layers of suitable fabric which is preferably at least moderately elastic so as to minimize wrinkling and tearing and promote the uniform thickness and surface appearance of the finished article. As shown more in detail in Fig. 2, three fabric layers 1, 2, 3, may be used to form the body 10 of this horn and the inner layers 1, 2 are preferably coated or quite thoroughly impregnated with suitable phenolic condensation cementing material, such, for instance, as bakelite, condensite or redmanol varnish compositions with which the fabric may be repeatedly coated or saturated and then dried preferably in approximately the shape of the final article. The outer layer 3 may be of similarly impregnated or coated knit fabric, or in some cases this outside layer may be a relatively smooth knit fabric which is applied in its original uncoated condition to the impregnated and dried fabric layers beneath so that in the subsequent heat curing and pressure moulding step all the fabrics are united by the incorporated phenolic condensation cementing material and the outer layer of fabric is left in somewhat absorbent or porous fibrous condition which allows it to be painted or decorated in some cases in the finished article to suit the particular artistic requirements of the trade. Stencilled patterns may be applied to the finished article in this way, or if desired the outer or other exposed fabric surface may be stencilled or otherwise decorated or colored before it is applied to the other fabric layers and securely united thereto during the moulding operation.

A convenient way of assembling and impregnating such fabric layers is to have narrowed or fashioned knit fabric stretched or mounted on a suitable support before or after it has the varnish or other liquid phenolic condensation cementing material incorporated therewith by coating or dipping and wringing processes, a wire ring such as 9 being preferably incorporated in or sewed or otherwise secured to the fabric at the large end of the horn blank. The support may as indicated in Fig. 3 be formed of united wire elements, such as 13, 14, and may be provided with wire hooks or projecting retainers 12 to sufficiently engage the lower edges of the fabric layers 1, 2 of the blank or the ring 9 therein to hold this end of the blank in place while the other ends of each fabric layer may advantageously be brought or closed together by a puckering string or device to form a closed end 11 which is held in position on the corresponding end of the support. The one or more fabric layers on this support which is preferably of the general shape of the final horn or other hollow article desired may be coated or impregnated to the desired extent with such phenolic condensation cementing material by any desired applying device, such as spraying distributors or the like which more or less uniformly apply the material thereto, successive applications of varnish compositions of this character being made at intervals, if desired to allow the material to be more uniformly absorbed by the knit or other fabric. In this or other ways it is possible to secure the incorporation with the fabric of the desired amount of dried phenolic condensation cementing material which may be in the neighborhood of thirty to sixty per cent by weight of the entire dried impregnated fabric which may be dried at moderate heats of 160° to 180° F. or so.

The dried fabric blank may then be disengaged from the wire or other support and heat cured in any suitable mould to a sufficient degree to preferably effect the moderate or substantial curing of the phenolic condensation cementing material and Fig. 4 indicates a pressure curing mould in which this may be effected. The hollow mould section 17 of cast iron or other material may be provided with any desired arrangement of channels 19 for the steam or other heating fluid and the cooperating internal mould section 16 may be formed, if desired, with steam heating channels 18, although these are not necessary in all cases. These moulds may be conveniently formed by making a wood or other pattern of the shape of the outside of the horn desired and then making therefrom a plaster of Paris or other hollow pattern which may be used to cast the hollow mould section, then the orginal wood or other horn pattern may be turned down or otherwise reduced in thickness to such extent throughout its entire surface as corresponds to the desired thickness of the horn at various parts, a substantially uniform reduction being readily effected in a turning lathe by usual turning tools and guides. Then this reduced pattern may be used to produce directly the cast iron internal mould 16 after which the cooperating mould surfaces are ground or otherwise smoothed or finished in any desired way. In moulding such a fabric horn the mould sections are preferably heated to temperatures of 300° to 320° F. more or less depending on the particular phenolic condensation cementing material used and the impregnated fabric blank may be quickly slipped over the heated internal mould which may in some cases advantageously have a metallic cap or flanged removable top, such as 15, placed upon it. The heat of the adjacent mould quickly softens and renders plastic the phenolic condensation cementing material so that the impregnated fabric may be brought down snugly over the internal mould and when the cooperating mould is forced strongly down upon it in a hydraulic or other heavy press the elastic fabric naturally fits smoothly and uniformily between these two cooperating mould sections, the metal ring serving to locate accurately the lower or large diameter edge of the fabric blank and this metallic ring may of course be conveniently located on the internal mould by retainer pins or devices of any suitable character in some cases. The heat curing of the impregnated fabric material which should be simultaneously compressed at pressures of a number of hundred pounds per square inch may be completed in fifteen to thirty minutes more or less at the curing temperatures indicated where bakelite varnish No. 1 is used as the cementing material. The moulds may then be separated and the cured fabric horn removed from the mould sections in any suitable or desired way. The metal ring around the larger lower end of the horn may be gently disengaged from the cooperating mould section and the adjacent cured fabric may be successively loosened from the mould, after which the horn may be allowed to cool in vertical position. In some cases, however, the horn may be removed from the internal mould section by grasping the superimposed closed ends 11 of the fabric and pulling upward thereon preferably in connection with the loosening and disengaging of the lower end of the horn as above indicated. Of course where the moulds are specially surfaced for artistic or other reasons, the disengagement of the cured impregnated fabric from engraved or otherwise embossed or roughened mould surfaces may be promoted by first thinly coating the hot moulds with a solution of suitable heavy greasy or soapy material which greatly minimizes the sticking of the cured fabric thereto. In some cases especially where such disengaging medium is not used it is sometimes desirable to use hot gases or vapor under pressure to assist the disengagement of the cured article from the moulds which may sometimes be formed with small steam passages, such as the upward extension of the steam passage 38 for this purpose.

Fig. 5 shows another type of mould in which hollow articles of this general description may in some cases be advantageously heat cured and simultaneously moulded under pressure. The mould 41 of cast iron or other suitable material may be formed with steam or other heating passages 42 and with an accurately shaped mould cavity corresponding to the shape of the phonograph horn or other finished article desired. The cooperating mould 43 which may be formed with similar heating passages 44 may have secured thereto a flexible or elastic moulding member 45 of vulcanized rubber or other suitable somewhat elastic material in which, if desired, knit or other fabric may be incorporated in some cases. The edges 47 of this moulding member may be securely held in position in the mould section 43 as by being clamped thereto by the clamping ring 48 so that a tight joint is formed around the edge of this flexible moulding member which may be powerfully distended by the action of heated oil or other fluid supplied to the hollow space within this moulding member as through the hydraulic supply passage 49. The horn or other hollow blank 10 may be inserted in the properly shaped cavity in the mould member 41, the ring 9 in this horn blank being accommodated in a recess in this mould member in which it may be held by clamping devices, if desired. Then the cooperating mould member 43 may be forced into place by the action of a hydraulic press bringing the elastic internal mould member 45 within the blank in about the position indicated. Then if the fluid is forced into the elastic moulding member it may be powerfully forced against the blank, the elastic or flexible character of this moulding member 45 allowing its tip 46 to be forced into the hollow tip of the blank which is simultaneously forced against the mould cavity throughout all its parts and a heavy pressure up to a number of hundred pounds per square inch or so may thus be secured to effectively compress the fabric blank while the phenolic condensation cementing material therein is being cured by the heat supplied by the outer and inner mould members. When this curing has been completed the flexible moulding member may preferably be somewhat retracted by discharging hydraulic pressure fluid therefrom and then the rigid mould sections may be separated for the removal of the cured article from the hollow mould. This type of moulding apparatus may of course be used where the article is not shaped or arched up to such a great extent and more nearly flat articles having special surface projections or shaped elements may advantageously be formed in this way.

In some cases the separate flexible moulding member may be omitted or replaced by a waterproof or impervious lining layer formed on or secured in any suitable way to the fabric blank, as by attaching thereto a rubberized knit or other fabric which preferably extends outward so as to make contact with the adjacent shaping mould member or be forced tightly into the joints between the moulds. As shown in Fig. 5ª the hollow mould may, if desired, be formed in sections 51, 60 clamped together in any suitable way and formed with a conical, cylindrical or other cavity of any desired size and shape. Cooperating mould sections, such as 50, 52, may be used in connection therewith and forced accurately against the same by hydraulic pressure or otherwise. The fabric may comprise several layers of fabric or other fibrous material, such as 54, 55, and may, if desired, be formed of or comprise elastic or knit fabric; and these fabric layers may carry and preferably be quite thoroughly impregnated with suitable proportions of phenolic condensation cementing material before being dried preferably in substantially the form of the article desired. The impervious or rubber layer may be elastic vulcanized rubber such as 59 having a surface carrying or covered with French chalk or other inert material in such proportions as to facilitate subsequent disengagement after the moulding and curing operation. Although it is not necessary in all cases this rubber or impervious layer may sometimes be advantageously mounted on a somewhat elastic fabric, such as 56, into which it may be frictioned or otherwise incorporated or attached before the parts are assembled. In conical or cylindrical hollow articles, such as tubes, etc., the fabric layers may be wound on mandrels or other forms and one or more of the fabric layers may be incorporated or coated with such phenolic condensation cementing material as desired before or after this method of forming. When the blanks are assembled in such heat curing moulds as shown in Fig. 5ª the edges of the blanks may sometimes be advantageously carried up between the hollow mould section and one or more of the cooperating end mould sections as at 57, and it is usually desirable for best results to carry the impervious rubber layer up between these mould sections or to otherwise ensure its effective substantially tight engagement with the hollow mould to prevent leakage past the same. The other end of the blank may in some cases have a similar joint or closure portion 58 adjacent the mould section 52. When the blank is in position in the mould which may in some cases be advantageously preliminarily heated and the end mould sections forced home by hydraulic presses or otherwise, the curing fluid may be forced into the hollow mould through the passage 52 and powerfully forced out the blank to fill the hollow mould cavity and simultaneously heat and cure the blank if hot pressure fluid is used, such as steam or hot oil, etc. If desired the rubberized impervious fabric may be stripped off or removed from the inside of the cured article, or it may be left within the same and more securely connected to the other layers when the inert parting material is omitted. In some cases the hollow blank may fit sufficiently tightly adjacent its ends so that special rubber or other impervious elastic layer or facing is unnecessary, although such facing is usually desirable where the cured article is to be free from pin holes or imperfections and have more uniform dielectric strength. The cured fabric horns made in any way as described may be provided with connecting devices of any desired type or character and as indicated in Fig. 2 an internal brass or other metallic collar 4 may be used preferably in connection with a metallic sleeve 5, 6, on the outside of the throat of the horn, which may be secured in place as by rivets 7, one or more of these rivets being provided with an enlarged head or locking lug such as 8 adapted to engage with a bayonet slot securing device on the cooperating horn member or support.

If desired, of course, one or more of the internal layers of such a fabric horn may be built up of strips of any suitable cloth or fabric, and if desired woven or especially knit fabric gores or sections may be sewed together to form a horn blank of this general character and such a fabric horn blank may be mounted on a wire or other support of the type indicated in Fig. 3 and coated or impregnated with suitable phenolic condensation cementing material, the successive layers of such tailored fabric being basted or otherwise secured together and to the bottom ring, an outer layer of one piece material, such as plain or impregnated or coated knit fabric being usually desirable where uniform surface appearance is desired. Fig. 6 shows a tailored fabric horn of this general character, the lower or mouth section 20 of the horn being as indicated made up of a series of fabric gores or sections 35, 36, 37, which may be sewed together or otherwise united in the fabric blank before the impregnated fabric is cured and simultaneously shaped or moulded in the heat curing treatment as described. In some cases also the intermediate or inner layers of such a fabric horn blank may be formed of strips of cloth or paper tape wound on the support and inner layers by hand, for example, and local enforcements of such material as fabric tape, particularly knit or braided fabric being desirable where local increased strength is desired in any of these horns or other hollow articles. As indicated in Fig. 6 the impregnated fabric element 20 of the horn may be secured as by the rivets 22 to a metal throat or connector member 21 of spun brass or otherwise formed sheet metal which may as indicated substantially continue the contour of the mouth portions of the horn.

Acoustic horns of this general type may in many instances be formed of several pieces of cured impregnated fabric. As is shown in Fig. 7, the mouth-piece 24 may be formed in suitable moulds of a number of layers of impregnated knit or other fabric or fibrous material and this section may have the junction portion or edge 27 overlapped by the junction portion 26 on the throat section 23 of the horn which may, if desired, be separately moulded and shaped of one or more layers of similar knit or other impregnated fabric. These two horn sections may be cemented or otherwise secured together in connection, if desired, with rivets 25. Fig. 8 shows another arrangement in which the sections 28, 30 of the built-up horn comprise two longitudinal halves of the flaring horn which may have some such outside shape as is indicated in Fig. 7. These two halves of the Fig. 8 horn may have overlapping edge portions 29, 31 riveted or otherwise secured together. Fig. 9 shows another special shape of horn 32 such as is used in some concealed horn types of phonographs. The mouth-piece end 33 of this horn may be of any desired shape or outline to cooperate with the casing in which it is mounted and the other or smaller end 34 may of course be secured to the metallic or other part of the sound passage of the phonograph or other acoustic instrument. A special shaped horn of this character may in many cases be advantageously formed of one or more layers of impregnated knit fabric of this general character and it is sometimes advantageous to first form a special horn of this description by a pressure moulding and curing process in which the fabric horn blank is moulded under high pressure in a conical or other simpler shape in which the outlines may be straight, the duration and intensity of the curing heat only being sufficient to partially cure the incorporated phenolic condensation cementing material. A curing of three to five minutes or so at a temperature of 300° to 320° F. gives sufficient curing action with incorporated bakelite varnish composition so as to insure the adherence and compact condition of the fabric which may however by reheating to about this temperature be reshaped in any desired way. By forcing such a partially cured fabric horn blank on a curved metallic mould which has been immersed in hot paraffin kept at a temperature of 300° F. or more the phenolic condensation cementing material is sufficiently softened so that the impregnated fabric is rendered quite pliable and re-shaping may be readily effected by forcing such a hollow partially cured and re-softened blank onto a curved forming device or by rolls or other shaping members after which the continued heat of the oil or other bath completes the curing of the phenolic condensation cementing material and simultaneously increases the strengh of the article. When multiple layer fabric of this general character containing about fifty percent by weight of bakelite varnish composition has been cured to the medium or complete curing of the material it possesses an astonishingly high degree of elastic stiffness and strength so as to approach in strength some grades of brass while having much lighter weight which makes it much more advantageous for many kinds of phonograph and acoustic work. For some purposes, however, sufficient strength may be secured by uniting under suitable pressure and heat knit or similarly elastic fabric or fibrous material which has been impregnated or coated with suitable resinous cementing material such as shellac, toughened rosin or other suitable varnish gum compositions.

This invention has been disclosed in connection with a number of illustrative embodiments, forms, proportions, elements, parts, shapes, materials, compositions, conditions, and methods of preparation, production and use to the details of which disclosure the invention is not of course to be limited, since what is claimed as new and what is desired to be secured by Letters Patent is set forth in the appended claims:

1. The flaring horn adapted for phonograph or similar acoustic purposes and comprising a plurality of layers of fashioned knit fabric generally conforming to the shape of the finished article, the exposed fabric being unitary, cured phenolic condensation cementing material incorporated in the inner layers of fabric to the extent of thirty to sixty percent by weight of the impregnated fabric material and securing the fabric layers together.

2. The flaring flower petal acoustic horn comprising a plurality of layers of fabric united by incorporated cured phenolic condensation cementing and strengthening material, the exposed layers each being a unitary layer of knit fabric secured by such cementing material and having an absorbent exposed surface adapted for pigment ornamentation.

3. The flaring acoustic horn comprising a plurality of layers of fabric united by incorporated cured phenolic condensation cementing and strengthening material, an exposed layer being unitary knit fabric secured by such cementing material.

HENRY C. EGERTON.